No. 808,031. PATENTED DEC. 19, 1905.
J. W. FAESSLER.
CUTTER FOR FLUE SHEETS AND THE LIKE.
APPLICATION FILED AUG. 25, 1904.

ATTEST
a. J. McCauley
Alfred Ricks

INVENTOR:-
John W. Faessler,
BY Higdon & Longan & Hopkins,
ATTYS.

UNITED STATES PATENT OFFICE.

JOHN W. FAESSLER, OF MOBERLY, MISSOURI.

CUTTER FOR FLUE-SHEETS AND THE LIKE.

No. 808,031.      Specification of Letters Patent.      Patented Dec. 19, 1905.

Application filed August 25, 1904. Serial No. 222,173.

*To all whom it may concern:*

Be it known that I, JOHN W. FAESSLER, a citizen of the United States, and a resident of Moberly, county of Randolph, State of Missouri, have invented certain new and useful Improvements in Cutters for Flue-Sheets and the Like, of which the following is a specification containing a full, clear, and exact description, reference being had to the accompanying drawings, forming a part hereof.

My invention relates to cutters for flue-sheets and the like; and it consists of the novel features herein shown, described, and claimed.

Figure 1:
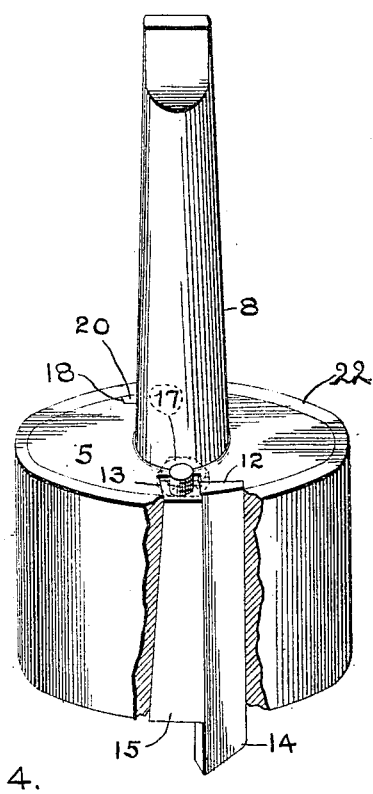
Figure 2:
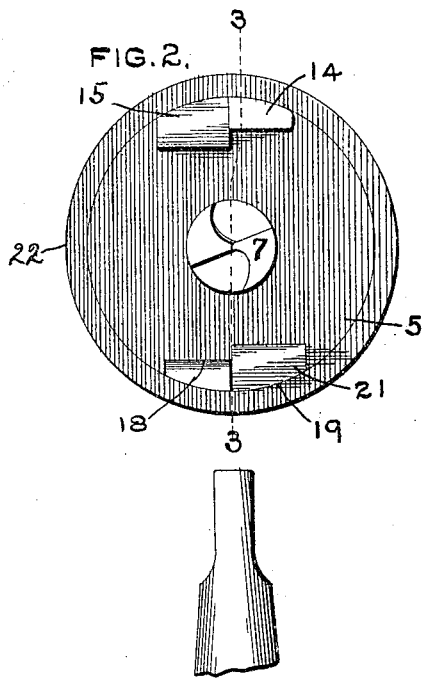
Figure 3:
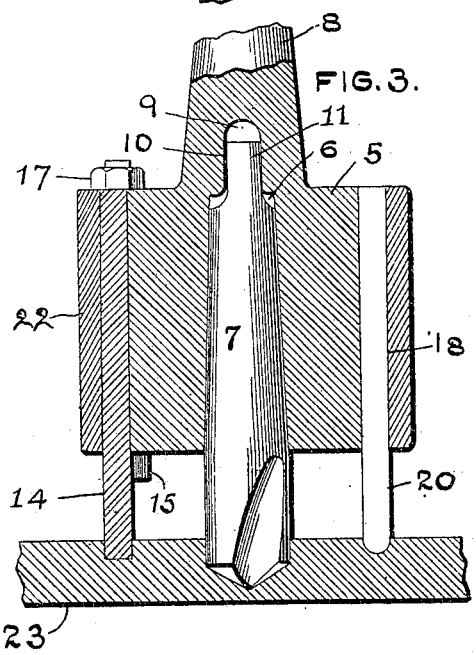
Figure 4:
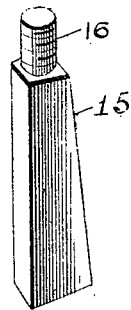
Figure 5:
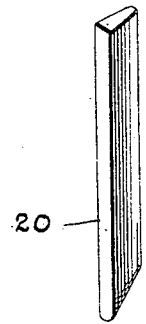

In the drawings, Figure 1 is a perspective of a cutter embodying the principles of my invention, parts being shown in section to illustrate the construction. Fig. 2 is a bottom plan view of the cutter shown in Fig. 1. Fig. 3 is a vertical central section on the line 3 3 of Fig. 2. Fig. 4 is a perspective of one of the keys used in holding the cutting-tools in place. Fig. 5 is a perspective of the round-nose cutting-tool.

Referring to the drawings in detail, the head 5 has a central bore 6 tapered to receive the shank of the drill 7. An operating-shank 8 extends from the head 5 to be inserted into the drill-chuck, and an opening 9 is formed transversely through the shank for the insertion of a tool to drive the drill 7 out of the bore 6, the lower end 10 of said opening 9 being slotted to receive the flat upper end 11 of the drill and prevent the drill from rotating. A tool-seat 12 is milled in one side of the head 5, and a key-seat 13 is formed beside the tool-seat. The square-nose tool 14 is placed in the tool-seat 12, and the wedge-shaped key 15 is placed in the key-seat 13, the upper end of the key having a screw-threaded nipple 16 to receive an adjusting-nut 17. Upon the opposite side of the head 5 from the seats 12 and 13 a tool-seat 18 is formed, and a key-seat 19 is formed beside the tool-seat. A round-nose tool 20 is placed in the tool-seat 18, and a key 21, similar to the key 15, is placed in the key-seat 19. The tools and keys are removable, and before they are placed in position the ring 22 is tightly mounted upon the head 5, so as to complete the housing of the keys and tools.

The length of the drill 7 will constantly decrease as the drill is sharpened, and the cutting-tools 14 and 20 may be adjusted to suit the length of the drill by manipulating the keys 15 and 21. The round-nose tool should be adjusted to cut deeper than the square-nose tool, as it starts the groove and the square-nose tool will finish it. The drill should be adjusted somewhat longer than the tools, so that the drill will become firmly seated in the flue-plate 23 before the tools 14 and 20 start to cut, so that the drill will serve as a center, around which the tools will cut.

It is obvious that this cutter may be used for many purposes besides cutting flue-holes in flue-sheets for the construction of boilers, &c.

I claim—

In a cutter for flue-sheets and the like, a cylindrical head, a shank integral with said head and projecting upwardly therefrom, and there being a centrally-arranged bore formed in said head and there being vertically-arranged key-seats and tool-seats formed in the periphery of said head on opposite sides thereof, tools arranged in said tool-seats, keys arranged in the key-seats, screw-threaded stems for said keys, a ring tightly fitted upon the head and the tools and keys, and nuts engaged upon the said screw-threaded stems, which nuts overlie the edges of said ring, substantially as specified.

In testimony whereof I have signed my name to this specification in presence of two subscribing witnesses.

JOHN W. FAESSLER.

Witnesses:
     ALFRED A. EICKS,
     M. M. BRAZILL.